June 6, 1961

R. A. PETERSON 2,986,827

BULLDOZER FOR TANDEM PUSH LOADING

Filed April 10, 1958

INVENTOR.
ROBERT A. PETERSON
BY
ATTORNEY.

INVENTOR.
ROBERT A. PETERSON
BY
ATTORNEY.

INVENTOR.
ROBERT A. PETERSON

ATTORNEY.

2,986,827
BULLDOZER FOR TANDEM PUSH LOADING
Robert A. Peterson, San Leandro, Calif., assignor to Caterpillar Tractor Co., Peoria, Ill., a corporation of California
Filed Apr. 10, 1958, Ser. No. 727,723
3 Claims. (Cl. 37—144)

This invention relates to improvements in bulldozer structure that enable the team use of two or more bulldozers in tandem push loading of earth-moving scrapers.

It has long been conventional for earth-moving scrapers to be pulled by a powerful prime mover capable of relatively high speeds (e.g. 30–40 m.p.h.) and to supplement the power of the prime mover during the loading operation by pushing against the rear of the scraper with a bulldozer. Considerable additional power is needed for about a minute or less during the loading of the scraper with dirt, and push-loading provides this power, so that the scraper can be filled with dirt in a minimum of time and with maximum efficiency. For the pushing bulldozer is used only during the loading operation, which may take less than one minute out of a thirty-minute cycle. During the remainder of the cycle the prime mover hauls the scraper away at a higher speed than the loading tractor is capable of, dumps the dirt, and returns the empty scraper to the loading site at a still higher speed.

In the past few years, however, the demand of contractors that excavation be speeded has led to difficulties. Larger scrapers were clearly indicated, but they could be used only if there was enough power available to load them. Increases in the size and power of tractors are not always feasible; soon the practical maximum in tractor size is reached and a point of diminishing returns begins to enter.

The present invention solves this problem by making tandem loading both feasible and practical. In tandem loading, a team of two or more bulldozers is employed to push the scraper. Not only is more loading power brought to bear than can be applied by a single bulldozer, but the efficiency and speed of the loading operation is increased, since both tractors are used together only during actual loading; when the scraper is filled and its bowl raised, the forward tractor helps the prime mover get up speed and shift into second gear while the rear tractor disengages itself and lines up behind the next scraper, becoming the forward push-loader for that scraper. When the forward tractor for the first load finishes its pushing, it comes around behind the next scraper and becomes the rear pusher on the next load. Thus, the present invention makes it possible to excavate much faster and more efficiently than has heretofore been possible.

However, the present invention involves much more than merely using two tractors where one had been used before. Tandem loading involves problems that do not exist in single-tractor push-loading, and a brief consideration of these problems is necessary in order to understand the structural modifications which solved the problems and made it possible to use tandem loading.

For push loading, the wide bulldozer blades in normal use are awkward and impractical. These conventional blades extend laterally beyond the bulldozer's tracks, reducing the maneuverability of the bulldozer, limiting its use to areas wider than the blade, causing the bulldozer to gouge into banks and slopes. Often this structure results in bad balance, and it increases the likelihood of damage to the large and expensive tires of the scraper. Hence, a narrower bulldozer blade has been indicated. But a narrower blade could not be provided so long as the blade was supported by frame members attached to the outside of the main tractor frame and outside the tracks. The present invention therefore utilizes what may be called inside arm dozers, in which the dozer blade is mounted on the tractor by an arm assembly that passes below the tractor frame and in between the tracks. Thus, the blade and its supporting members can all be made narrower than the distance across the outside edges of the track. As a result, maneuverability in the pit has been improved, the bulldozer can work in more restricted work areas, gouging of the banks and slopes has been eliminated, balance has been improved, and the scraper tires protected from damage.

A second problem is that there is no good place to push against at the rear of a conventional bulldozer tractor. This problem might appear to be simply solved by providing an extension on the tractor frame, but once this is done, two very difficult problems remain.

When the blade of the rear bulldozer comes against the rear of the forward bulldozer, there is a considerable jolt, especially when large 320-horsepower tractors are being used. Since the tractors are moving over very rough terrain in this work, the jolting continues during the loading.

The cushioning of such shocks and jolts is a difficult problem. It is not a matter of simply putting a shock absorber on the push block or on the bulldozer blade, or of providing a shock-absorbent connection between the bulldozer blade or push block and the tractor frame. Among the difficulties are the fact that the jolting forces against the bulldozer blade at the front and the push block at the rear are not solely direct pushing forces along the axis of the tractor. Due to the fact that these tractors are always used in rough terrain, there is considerable movement up and down and from side to side to such an extent that were the forces directly applied against an elastomeric compression block, the other disruptive components of the forces would act to fracture the compression block or to disconnect it from the frame. It is easy to break or loosen the bond which holds such compression blocks when forces are applied along the bond plane. Thus, it has been a considerable problem to resolve all the impact forces against the push block and the bulldozer blade into true axial pushing forces that load but do not harm the cushioning blocks themselves.

The present invention has solved the cushioning problem by a novel construction that first absorbs the disruptive forces and then applies only the axial pushing force to a shock absorber. Both the rear push block and the bulldozer blade are cushioned so that all impacts against the front and rear of the tractor are cushioned. In conjunction with this cushioning, the invention provides a novel pivoting arrangement whereby both the bulldozer blade and the push block at the rear of the tractor are mounted on respective pivots where the non-pushing, non-axial forces are effectively resolved and restrained, and only the axial forces are transmitted to a resilient elastomeric cushioning block or other shock absorber, such as a spring device.

Thus, the pushing force against the front of both tractors is transmitted from the bulldozer blade through a pivoted member that absorbs the non-axial shocks to a resilient elastomeric block which absorbs a preponderant amount of the impact force by its compression and elastomeric flow, so as to considerably reduce the jar on the tractor and on its operator. Similarly, the push block at the rear of the forward tractor (and it should be remembered that both tractors of a tandem outfit are used alternately as the forward tractor) is provided with a similar arrangement incorporating a pivoted block and resilient elastomeric (or spring-type) cushion which, by its compression and flow, absorbs the shock of the blow struck from the rear against the push block.

The reduction in contact shock materially helps the operator and likewise reduces the severe mechanical strains that become imposed on the machines at the times of these jolting contacts. As a result of the reduction in contact shock, the total loading time can be reduced, for the operators can act more quickly, thus considerably increasing loading production.

Thus, among the objects of the invention are the provision of bulldozer structure making tandem pushing feasible and practical in the operation of loading scrapers.

Another object of the invention is to cushion the bulldozer blade at the front and the push block at the rear of the pushing tractors so as to prevent shock to the operator and to the machine and to increase the efficiency of both the operator and the machine and thereby speed up the loading operation.

Another object of the invention is to provide cushioning for a bulldozer blade of the inside-arm type, that is, of the type where the blade is secured to the frame of the tractor in between the tracks thereof.

Another object of the invention is to provide a cushioned bulldozer blade and a cushioned push block wherein the cushioning means is protected from relative movements other than those urged against them in a direction axial of the tractor.

Another object is to direct the push of the rear tractor against the push block of the forward tractor through the frame to the blade of the forward tractor without distorting final drive trains and other mechanical parts of either tractor.

Other objects and advantages of the invention will appear from the following description of some preferred embodiments thereof given in accordance with 35 U.S.C. 112.

*General explanation of tandem pushing*

Figure 1:
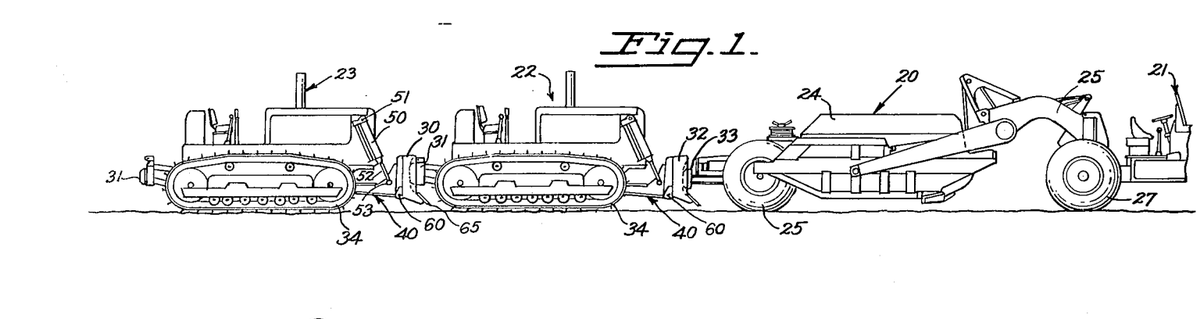
FIG. 1 is a view in side elevation showing a scraper being pulled by a prime mover (the forward part of which is cut off to conserve space) and pushed by two bulldozers in tandem, both bulldozers embodying the principles of the present invention.

FIG. 1 shows a typical tandem loading arrangement, where an earth-moving scraper 20 is being pulled by a prime-moving vehicle 21 and being pushed by a team of two identical bulldozers 22 and 23. All these vehicles are shown larger in FIGS. 2 and 3. The scraper 20 has an earth-carrying body 24, rear wheels 25, and a semitrailer coupling assembly 26 connected adjacent to the rear wheels 27 of the prime mover 21. When such a scraper 20 is once loaded with 30–35 yards of dirt, it is typically moved at speeds of 30 to 40 miles per hour by its prime mover 21. However, during the actual operation of filling the scraper 20, it takes considerably more power than can be provided by the prime mover 21. It has been conventional to use a single bulldozer behind the scraper 20 as a pusher, but as has been stated earlier, there is simply not enough power in a single bulldozer, even a very large one, to achieve efficient operation with the large scrapers 20 that are most efficient when the load is being moved.

In the present invention, therefore, a pair of bulldozers 22 and 23 are provided. The bulldozers 22, 23 are preferably substantially identical, since they alternate in their tandem positions; the bulldozer 23 now being used as the rear pusher will disengage iteslf and pull away as soon as the scraper 20 is full and the bowl raised. While the bulldozer 22 helps the prime mover to get the load rolling, the bulldozer 23 will get behind the next scraper, where it will be the forward pusher, the bulldozer 22 then comes around and pushes against the bulldozer 23. When the bulldozers 22 and 23 first come together, considerable shock is produced on the bulldozer blade 30 of the rear bulldozer 23 and on the push block 31 of the forward bulldozer 22. Similar shock is produced earlier by engagement of the blade 32 of the bulldozer 22 against the push block 33 of the scraper 20. Since there is no one in the scraper 20 and no machinery there is affected by these jolts, somewhat less protection is needed there, and the needed protection is supplied by the cushioning arrangement of the bulldozer blade 32. Since the bulldozers 22 and 23 typically have in excess of 300 horsepower and since they are working on very rough terrain, the shock of their engagement is quite severe and, were it not for this invention, would jar both the tractor operators and the tractor machinery so much that the operation could hardly be carried out—certainly not efficiently and not without undue wear and breakage of machine parts. Moreover, since the operation is inevitably in very rough terrain, there are in addition to the axial forces of impact, other forces, some moving vertically, others laterally, others at angles, all of which would tend to damage or destroy a resilient elastomeric shock absorber, whether it were mounted on or behind the bulldozer blade or mounted on or forward of the push block. From this brief illustration of the problem, it is hoped that the solution presented by this invention can be better appreciated.

*The inside-arm bulldozer blade and its cushioning*

Figure 3:
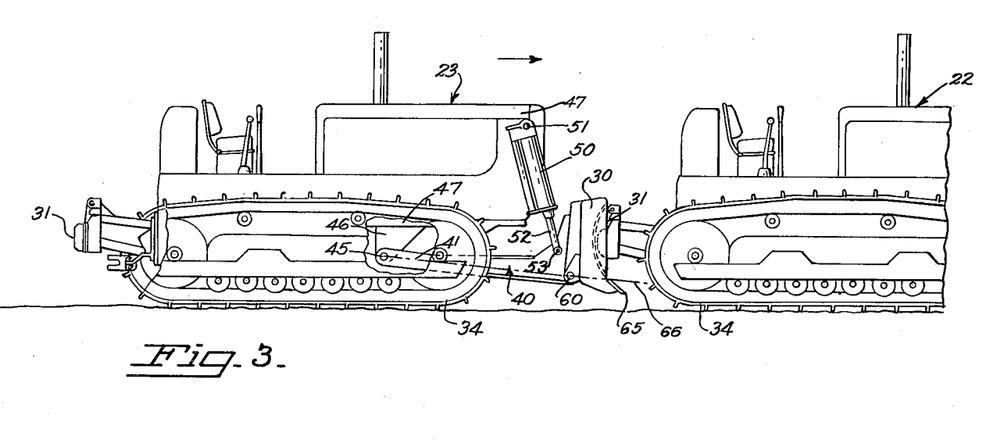
FIG. 3 is a view on the scale of FIG. 2 of the left half of FIG. 1 showing the rear part of the forward tractor and the full length of the rear tractor, with some portions thereof broken away in order to show the construction better.
Figure 4:
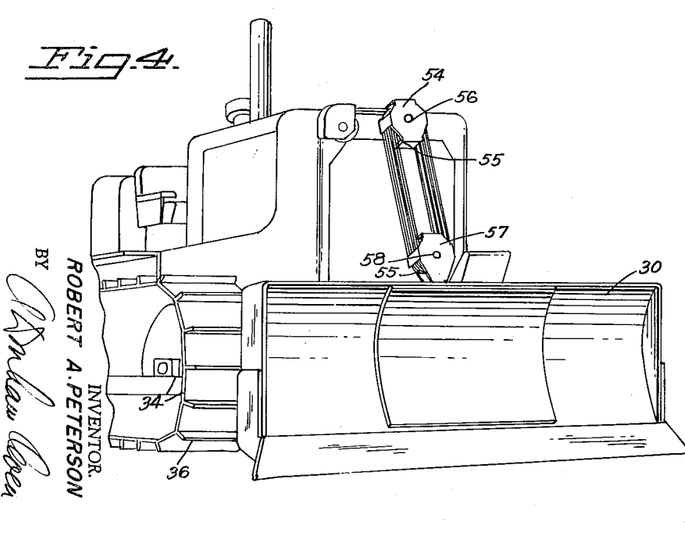
FIG. 4 is a view in perspective looking toward the front of a bulldozer embodying the principles of this invention and differing from the bulldozers shown in FIGS. 1–3 only in that it uses a cable-type lifter instead of a hydraulic lifter for the bulldozer blade.
Figure 5:
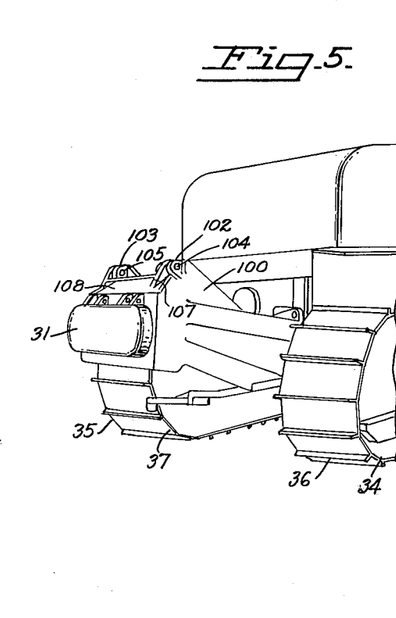
FIG. 5 is a fragmentary view in perspective looking at the rear of the bulldozer of FIG. 4 and showing a push block constructed according to the principles of the present invention.
Figure 8:
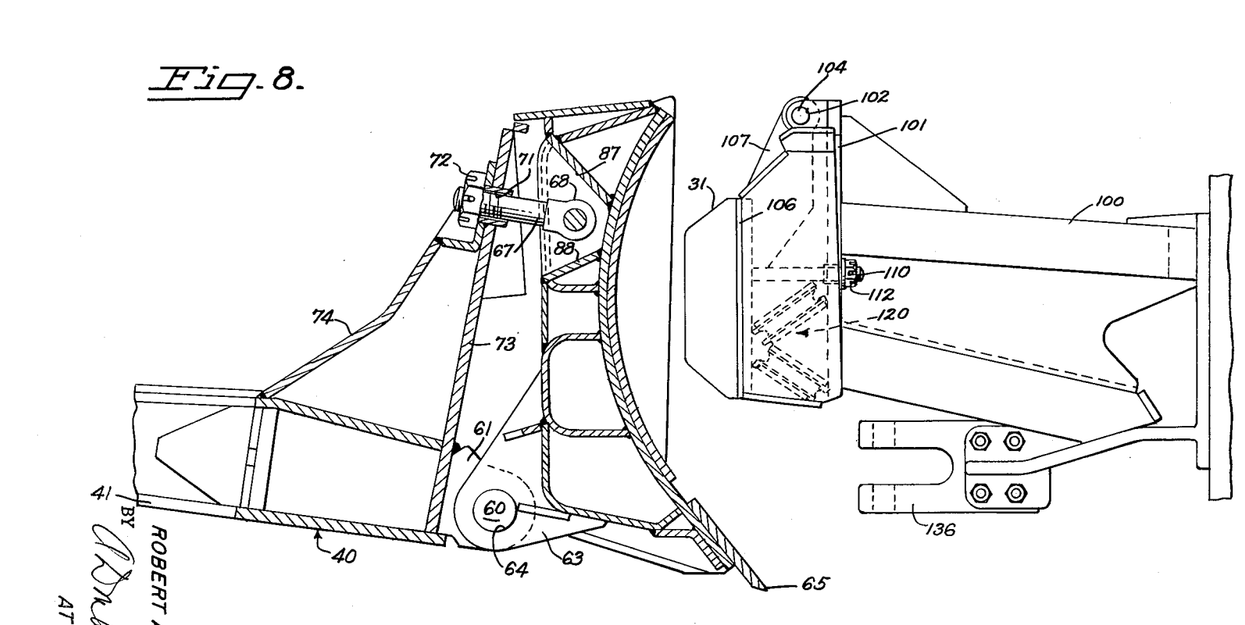
FIG. 8 is a view generally similar to and on the same scale as FIG. 6 but showing the blade and push block further apart, showing the push block in side elevation, and taking the section through the blade at a different location to show one of the limiting bolts therefor.

The bulldozer blades 30 and 32 used in this invention are identical and are the same width as or narrower than the distance between the outer edges 34 and 35 of the tracks 36 and 37 (see FIGS. 4 and 5). It is quite apparent that such a blade cannot conveniently be mounted by the conventional structure that extends along the side of the tractor outside the tracks and that such a mounting would considerably reduce its efficiency. The present invention utilizes an inside-mounted blade arm assembly 40. The arm assembly 40 may actually comprise a pair of arms 41 and 42 (FIG. 8). Since the blade 30 (or 32) must be raised and lowered for bulldozing operations, etc., the arms 41 and 42 are pivotally mounted. Preferably, as shown in FIG. 8, each arm 41, 42 has a clevis 43 with journals 44 and a pivot shaft 45. Each clevis 43 is aligned with a frame portion 46 through which the pivot shaft 45 also extends, completing the pivotal connection between the arm assembly 40 and the bulldozer frame 47 (FIG. 3). This particular pivot arrangement is used without as well as with the cushioning arrangement soon to be described, which also includes a pivotal mounting but of different parts, as will be explained later. The presently explained pivotal arrangement is used only for raising and lowering the bulldozer blade 30 or 32.

Figure 2:
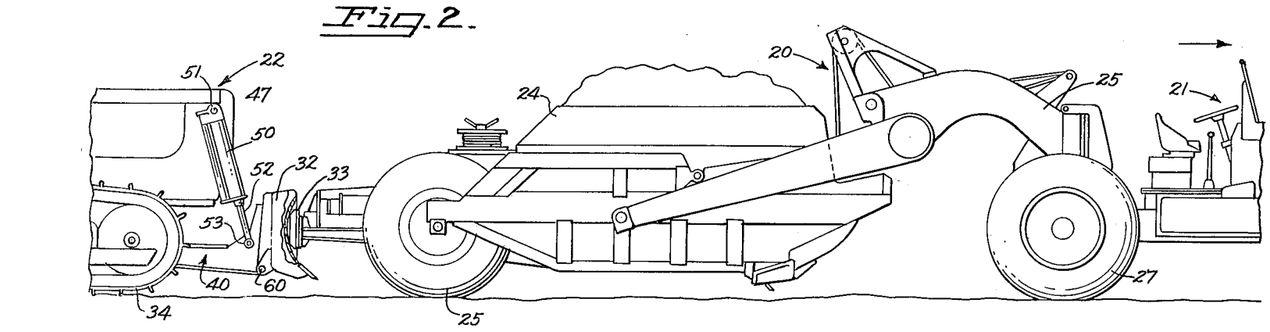
FIG. 2 is an enlarged view of the right half of FIG. 1, showing the scraper, the rear part of its prime mover, and the front part of the forward bulldozer.

The blade-lifting arrangement may be the hydraulic type shown in FIGS. 1 through 3, or the cable type shown in FIG. 4. In either event, it comprises hoist means with one end connected to the frame 47 and the other to the arm assembly 40. For example, in the hydraulic arrangement a cylinder 50 is pivotally mounted at a bearing 51 to the frame 47 and the piston (not shown) has a connecting rod 52 that extends out of the cylinder 50 and is pivotally mounted at a bearing 53 on the bulldozer arm assembly 40. When hydraulic fluid is applied to the lower side of the piston to move it up into the cylinder 50, the blade 30 or 32 is raised, and when the fluid is applied to the upper side of the piston, the blade 30 or 32 is lowered. Similarly, with a cable arrangement, one block 54 with its pulleys 55 is mounted on bearings 56 on the frame 47, while the other block 57 is mounted on bearings 58 on the arm assembly 40. The cables 59 are mounted and connected through their pulleys to a suitable drum (not shown), so that when the distance between the blocks 54 and 57 is shortened, the blade 30 is raised, and when it is elongated, the blade 30 is lowered.

A bulldozer blade not used in the present invention could be rigidly fixed to the arm assembly 40 and be practically integral with it, but such a blade would transmit the shocks and jolts of pushing directly to the pivots 45 and thence to the main frame 47 of the tractor. In the present invention an entirely different structure is provided, as best shown in FIGS. 6-9. Here the blade 30 (or 32) is mounted to the arm assembly 40 by pivot pins 60. For this purpose the front of the arm assembly 40 has a pair of projections 61 with journals 62, and the rear of the blade 30 has a pair of yokes 63 with journals 64.

Figure 6:
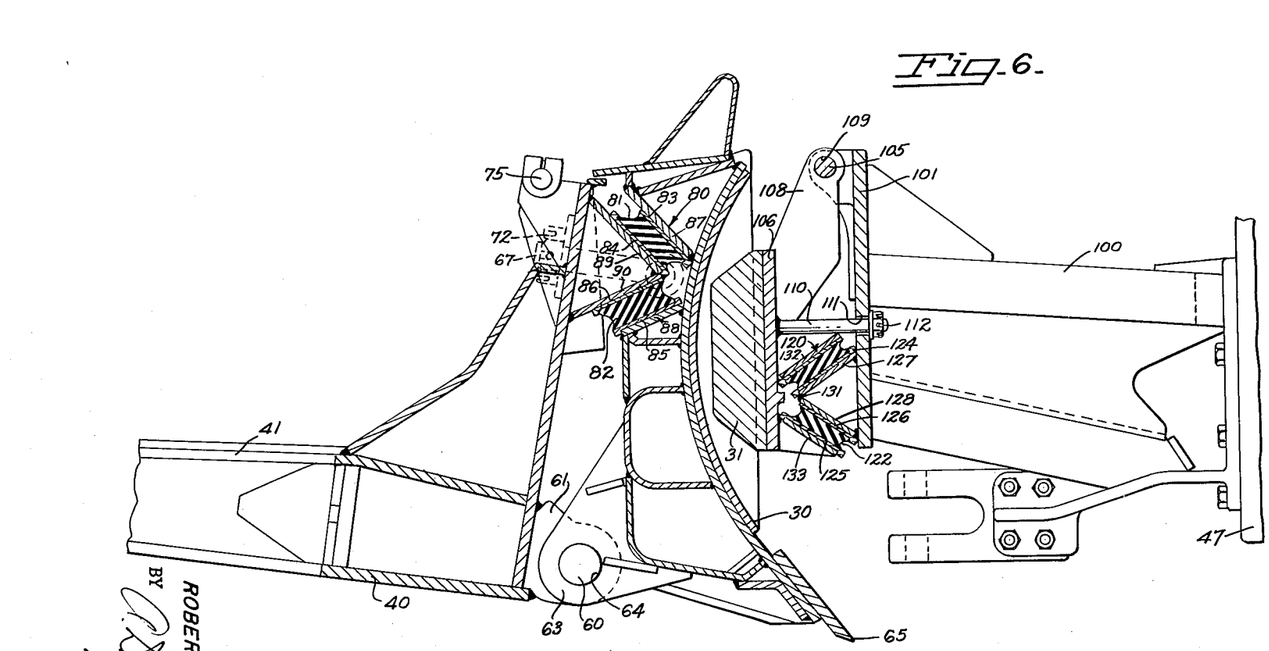
FIG. 6 is an enlarged fragmentary view in elevation and in section of the bulldozer blade and adjacent parts at the front of one bulldozer and the push block at the rear of another bulldozer, shortly before the blade engages the push block, showing the pivot arrangements and the cushioning elastomeric blocks.
Figure 7:
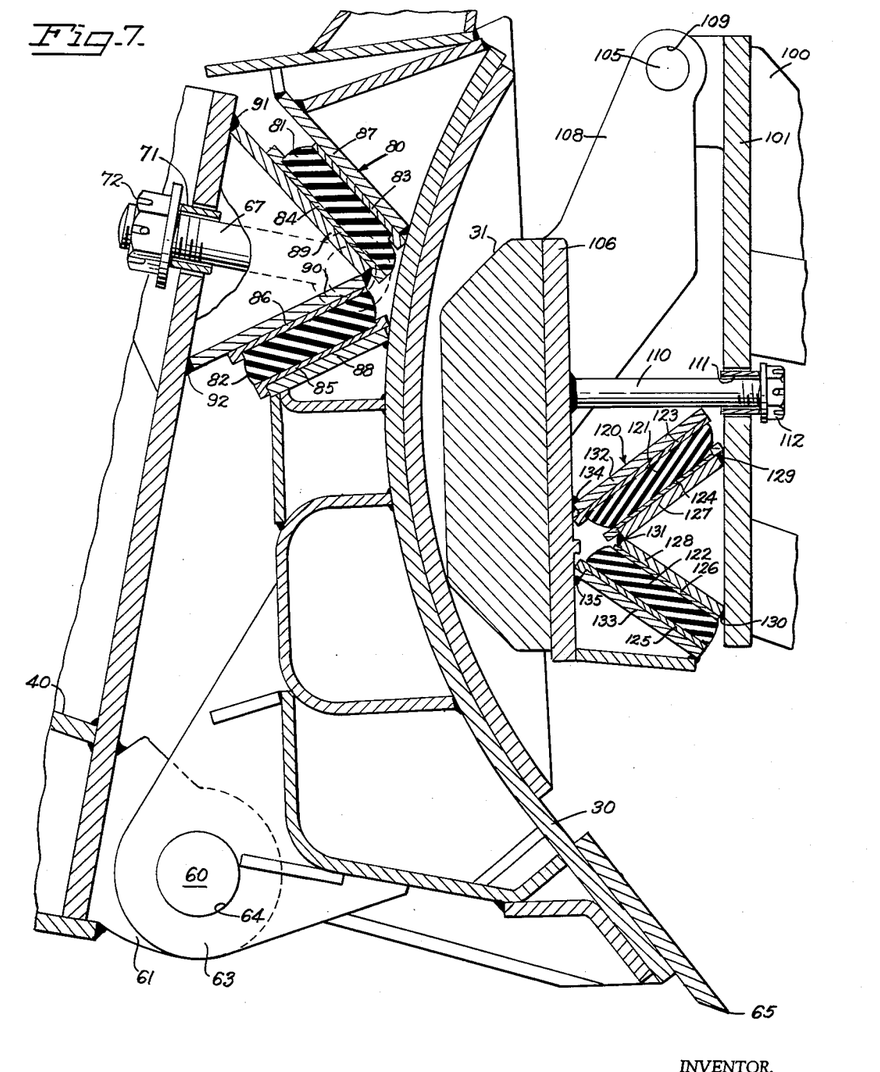
FIG. 7 is a further enlarged view in elevation and in section of the blade and push block of FIG. 6 in their engaged position, with the resilient elastomeric compression blocks compressed and flowing outwardly, so as to cushion the shock of impact.
Figure 9:
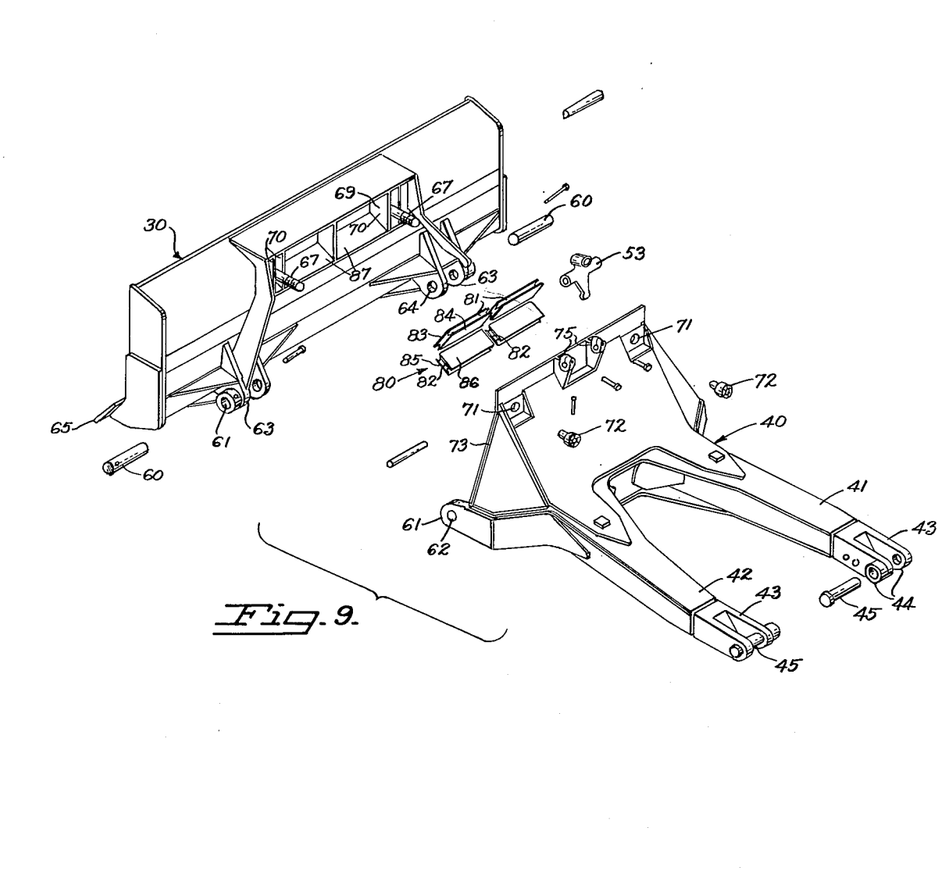
FIG. 9 is an exploded view in perspective of a bulldozer blade of the type that may be utilized in the present invention.

Bulldozing forces applied to the cutting edge 65 of the blade 30 will not effect rotation of the blade 30 on the pivots 60 because the edge 65 lies below the line 66 (see FIG. 3) joining the centers of the pivots 45 and 60 and because clockwise rotation (as seen in Figs. 6-8) of the blade 30 is prevented by a pair of limit bolts 67, best shown in FIGS. 8 and 9. One end of each limit bolt 67 is an eye 68 pivotally mounted on a pin 69 that is supported by brackets 70 which are welded to the rear of the blade 30. The other end of each bolt 67 extends through a bushing 71 in the bulldozer arm assembly 40 and is secured there by a nut 72 that limits the clockwise rotation of the blade 30.

The bushings 71 are in a vertical frame portion 73 of the arm assembly 40, which is strengthened by an angularly extending plate portion 74, to which it is welded or bolted. The frame portion 73 also supports the bearing 53 in bushings 75, for attachment of the hydraulic or cable block for lifting the blade arm 40, as has been previously described.

The limitation of counterclockwise movement of the blade 30 relative to the arm assembly 40 is effected by the cushion arrangement 80 of this invention. The resiliency of this cushion 80 is obtained by a V-arrangement of a plurality of converging pairs of elastomeric blocks 81, 82 that are adapted to be compressed between the bulldozer blade 30 and the vertical frame member 73. To the opposite faces of the resilient blocks 81, 82 are bonded metal plates 83, 84 and 85, 86, respectively. The resultant sandwich-like blocks are held between plates 87, 88 rigidly supported by the blade 30 and plates 89, 90 rigidly supported by the vertical frame 73. The rigid connections may be achieved by welding; for example the pair of heavy steel plates 89, 90 may be secured at one edge by welds 91, 92 to the vertical frame member 73 and to each other at their opposite edge by a weld 93, which lies substantially along the pivot line of the eye bolts 67 (see FIG. 7). The resilient cushions 80 are held in place by the eye bolts 67 and nuts 72, which are tightened just enough to place a slight compression on the cushions 80, thereby preventing them from falling out and ensuring their engagement and compression upon the application of any force applied to the bulldozer blade 30 above the line 66.

Thus bulldozing will have practically no rotative effect on the blade 30, while a pushing force applied high on the bulldozer blade 30 (as in FIG. 7) tends to rotate the bulldozer blade 30 counterclockwise, as seen in FIG. 7, and therefore acts to compress the resilient elastomeric cushions 80 and to cause the elastomer to flow outwardly. The forces are axial of the tractor, for there is only about ⅛" of play between the pivot members 61 and 63 and all the forces are resolved by the resistance to further movement of the steel members or by the rotation around the pivot 60. The cushion blocks 80 may be compressed up to about half of their original thickness, thereby absorbing the direct axial push or shock against the bulldozer blade 30. While the operator may still feel a slight bump, it will be nothing like the terrific jolt which he would otherwise have gotten and the tractor machinery is similarly protected.

So far only the action on the bulldozer blade 30 has been described, for this cushioning applies to both tractors 22 and 23 all the time that they are pushing, as well as when cushioning the initial jolts and those substantial jolts that occur due to variations in the speed between the two tractors or between the tractors and the scraper. In addition, it will be remembered that, this being a tandem arrangement, a terrific jolt occurs when the second tractor 33 engages the push block 31 of the forward tractor 32. The present invention also solves this problem.

The cushioned push block 31

As shown best in FIGS. 5-8 the pusher block 31 has a main supporting frame 100 which is bolted, or otherwise rigidly secured, to the tractor frame 47 and extends rearwardly therefrom a distance well beyond the ends of the tracks 36 and 37, so that the bulldozer blade 30 will never touch the tracks 36 and 37 but will engage only against the push block 31. The rear end of this rigid frame 100 comprises a vertical hinge plate 101 at the upper end of which are a pair of hinge journals 102, 103 for pivot pins 104, 105. The push block 31 itself is carried by a support member 106 with hinge arms 107, 108 each with an opening 109 through which the pivot pin 104 or 105 extends. The member 106 is therefore rotatable around the pivots 104, 105.

One (or more) stud bolt 110 is secured to and extends forward from the support member 106 and extends through an opening 111 in the vertical hinge plate 101. A nut 112 is threaded around the bolt 110 to limit the clockwise rotation (as seen in FIGS. 6-8) of the push block 31 and its support plate 106.

Counterclockwise rotation of the push block 31 is resolved against a resilient cushion 120. Like the cushion 80, the cushion 120 comprises a pair of resilient elastomeric blocks 121, 122 sandwiched between and bonded to metal plates 123, 124 and 125, 126. Support plates 127 and 128 may be welded in a V to the rear of the hinge plate 101 by welds 129 and 130 and to each other by weld 131. Plates 132 and 133 may be welded to the hinged push block support member 106 by welds 134 and 135. These plates 127, 128, 132, and 133 are independent of the sandwich plates 123, 124, 125, and 126, but engage them. As before, the cushion 120 is placed in slight minimum compression by the nut 112 on the bolt 110. This arrangement means that any non-axial forces imposed upon the push block 31 are transmitted to the pivot 105, there being only about 1/8" sidewise play here. The push block 31 and its pivot arrangement effectively remove all the lateral and vertical forces and transmit to the cushions 121 and 122 only the axial impact forces, which are then resolved by the cushions 121, 122 by their compression and outward elastomeric flow.

It will be noted that the pivot 105 for the push block 31 is shown on the upper end of the block, so that the forces against the block cause it to swing slightly downwardly. This is a preferable arrangement, but the pivot arrangement may instead be at the bottom or at one side and it need not be horizontal. However, putting the pivot at the top does not affect the ground clearance of the tractor, as could putting the pivot 105 at the bottom, although it is less necessary here to find a critical location for the pivot than on the bulldozer blade. It is also convenient to have the pivot 105 at the top when the pivot 60 on the bulldozer blade is at the bottom, because this makes both pivots operate in a similar manner and cooperate with the maximum of desirable results. Also the upper location of the pivot 105 does not impede the drawbar 136, which is used for pulling a towed load on suitable occasions. In fact the frame 100 is shown in FIG. 6 welded to the drawbar support frame 137, which is, of course, rigidly bolted to the tractor frame 47.

Figure 10:
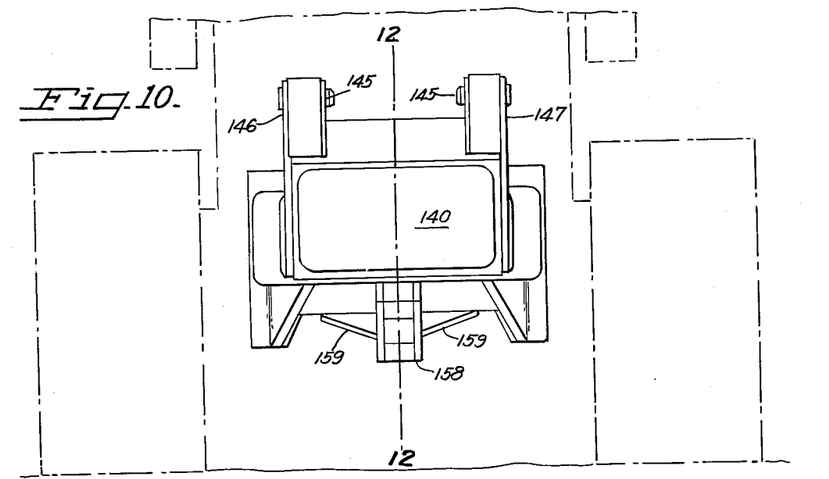
FIG. 10 is a view in rear elevation of a modified form of push block of the present invention mounted on the rear of a tractor, which is shown in outline only by broken lines and with some parts broken away.
Figure 11:
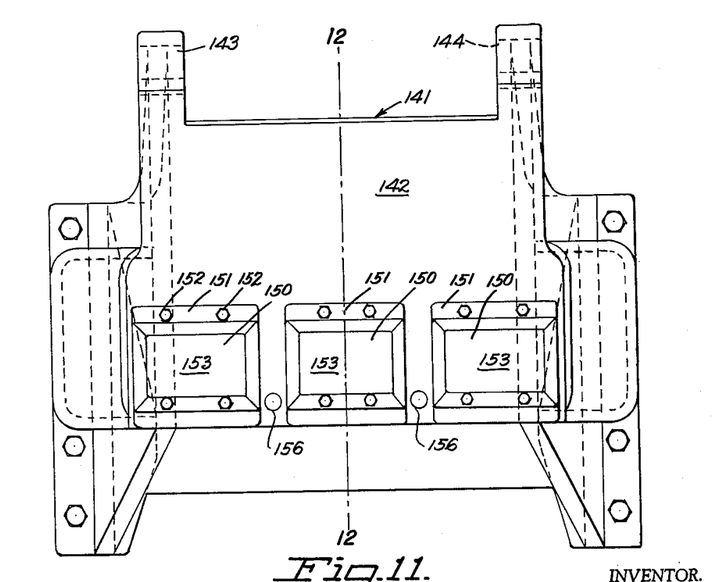
FIG. 11 is an enlarged view in rear elevation of the hinge plate of the modified form of push block shown in FIG. 10.
Figure 12:
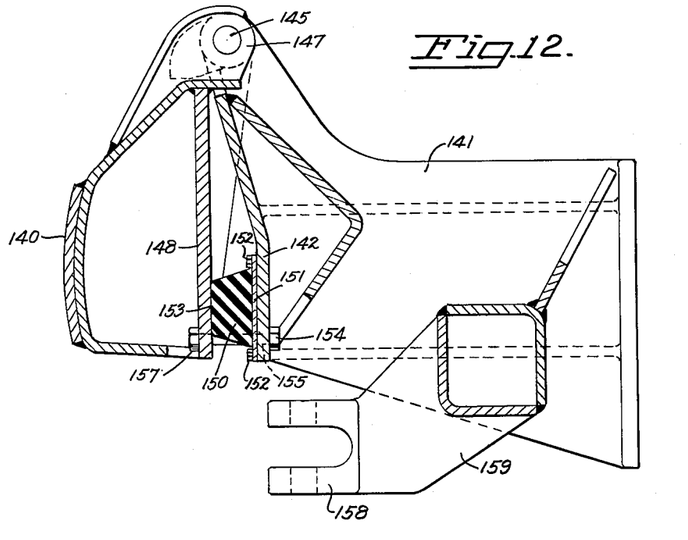
FIG. 12 is a view in side elevation and in section, on the scale of FIG. 11, taken along the line 12—12 in FIGS. 10 and 11.

*Modified push block 140 of FIGS. 10–12*

While the V-block cushions 80 and 120 have been shown in FIGS. 6–9, they are by no means the only possible cushioning structure. FIGS. 10–12 illustrate a modified form of push block 140 which is very useful and in many instances preferable. Here again there is a frame 141 with a generally vertical hinge plate 142 and a pair of hinge journals 143, 144 at its upper end. Pivot pins 145 extend through these, and similar openings in arms 146 of a push-block supporting member 147. The member 147 also supports a forward plate 148 which is substantially vertical. The resilient bumper member here comprises a series of trapezoidal blocks 150 of rubber or other elastomer bonded to a plate 151 which is secured by bolts 152 to the stationary plate 142. The forward plate 148 of the push block 140 bears directly against the opposite face 153 of the rubber member 150. This construction is less expensive and generally more desirable, for thicker rubber can be used and the construction is less special. Similar structure can be used to cushion the bulldozer blade 30, if desired.

Limit bolts 154 extend through openings 155 in the hinge plate 142 and openings 156 in the support plate 148. A nut 157 is tightened on it enough to place the cushion 150 in contact with the plate 148. No reliance is made on the bolts 154 to hold the cushion 150, but as a limit member it functions as the earlier-described limit bolt 110 does.

The assembly of FIGS. 10–12 also includes a built-in drawbar 158 integral with the frame 141 and depending from arms 159.

Figure 13:
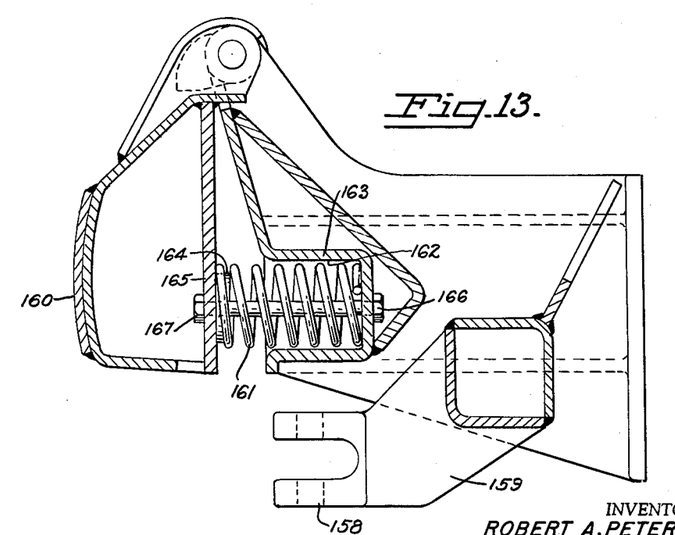
FIG. 13 is a view similar to FIG. 12 showing another modified form of push block constructed according to the invention.

*The push block 160 of FIG. 13*

FIG. 13 shows a further modification generally like the push block 140 of FIG. 12, but with the resilient elastomeric cushion 150 replaced by a resilient coil spring 161 which is mounted in a well 162 in the supporting frame member 163 and around a boss 164 against the rear of the push block plate 165 so that here, again, only axial forces are imparted through the pivot arrangement against the coil spring 161, to be resolved then by its resilient forces. A limit bolt 166 may extend axially through the spring 161 and may be properly tightened by nut 167.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A bulldozer for use in push loading of scrapers or the like which comprises the combination with a pair of tractor mounted forwardly extending push arms rigidly connected by a member spanning their forward ends, a bulldozer blade pivotally connected to said member on an axis parallel to said member and disposed above the lower cutting edge of the blade, resilient means between said member and the blade above said axis to resist and cushion rearward deflection of the blade upon pushing an object above said axis, and stop means to limit forward deflection of the blade due to resistance encountered by its cutting edge.

2. The bulldozer of claim 1 in which said resilient means is composed principally of an elastomer supported in a position to be compressed upon rearward deflection of the blade.

3. The bulldozer of claim 1 in which said stop means comprises at least one member pivotally connected relative to the rear surface of the blade and a portion extending through and having stopping engagement with the member which spans the forward ends of the push arms.

References Cited in the file of this patent

UNITED STATES PATENTS

| | | |
|---|---|---|
| 1,462,910 | Hainlen | July 24, 1923 |
| 1,529,668 | Perlman | Mar. 17, 1925 |
| 2,036,560 | Backus | Apr. 7, 1936 |
| 2,187,072 | Lebleu | Jan. 16, 1940 |
| 2,211,462 | Hobson | Aug. 13, 1940 |
| 2,211,463 | Hobson | Aug. 13, 1940 |
| 2,444,612 | Hyler | July 6, 1948 |
| 2,553,320 | Huff | May 15, 1951 |
| 2,734,292 | Graves | Feb. 14, 1956 |
| 2,740,213 | Barrett | Apr. 3, 1956 |
| 2,757,950 | Hagenbook | Aug. 7, 1956 |
| 2,784,508 | Risk | Mar. 12, 1957 |
| 2,788,999 | Fryer et al. | Apr. 16, 1957 |
| 2,821,795 | Williams | Feb. 4, 1958 |
| 2,841,232 | Loeffler | July 1, 1958 |

FOREIGN PATENTS

| | | |
|---|---|---|
| 170,857 | Canada | July 18, 1916 |
| 177,720 | Canada | June 19, 1917 |